(12) United States Patent
Courey, Jr.

(10) Patent No.: US 6,687,699 B1
(45) Date of Patent: Feb. 3, 2004

(54) SYSTEM AND METHOD FOR TRACKING COMPUTER DATA

(75) Inventor: Charles J. Courey, Jr., Folsum, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

(21) Appl. No.: 09/663,465

(22) Filed: Sep. 15, 2000

(51) Int. Cl.[7] .............................................. G06F 17/30
(52) U.S. Cl. .................... 707/10; 707/100; 707/101; 707/104.1; 707/206; 709/218; 709/213
(58) Field of Search ................................ 707/1–4, 7, 8, 707/102, 104.1, 10, 100, 206, 202; 710/22, 54, 57, 112; 711/129, 159, 153; 709/104, 108, 213

(56) References Cited

U.S. PATENT DOCUMENTS

| | | | | |
|---|---|---|---|---|
| 5,295,261 A | * | 3/1994 | Simonetti | 395/600 |
| 5,390,318 A | * | 2/1995 | Ramakrishnan et al. | 395/425 |
| 5,488,717 A | * | 1/1996 | Gibson et al. | 395/600 |
| 5,664,179 A | * | 9/1997 | Tucker | 395/611 |
| 5,717,916 A | * | 2/1998 | Verma | 395/607 |
| 5,737,732 A | * | 4/1998 | Gibson et al. | 707/2 |
| 5,875,352 A | * | 2/1999 | Gentry et al. | 395/843 |
| 6,003,033 A | * | 12/1999 | Amano et al. | 707/100 |
| 6,185,569 B1 | * | 2/2001 | East et al. | 707/101 |
| 6,243,783 B1 | * | 6/2001 | Smyers et al. | 710/129 |

* cited by examiner

Primary Examiner—Charles Rones
Assistant Examiner—Jacques Veillard

(57) ABSTRACT

One preferred embodiment is a system for tracking computer data, including at least one data set, at least one node table for each data set, at least one node entry for each node table, each node entry having a linked list identification, a previous pointer, and a next pointer, and at least one linked list referencing the at least one node entry. Another preferred embodiment is a method including the steps of creating at least one node entry designating a previous pointer and a next pointer for each data set, maintaining at least one node table having all the node entries for each data set, assigning a linked list identification to each node entry, and maintaining at least one linked list for each linked list identification.

15 Claims, 7 Drawing Sheets

SYSTEM AND METHOD FOR TRACKING COMPUTER DATA

The present invention generally relates to a system and method for tracking computer data. More particularly, it relates to a system and method that tracks computer data using at least one table having all the node entries for each data set, wherein each node entry has a linked list identification, a previous pointer, and a next pointer.

Linked lists are commonly used to keep reference positions for a computer data set. Nodes entries are generally found in the linked lists, and they are reference points of data elements. Nodes entries are updated as data structure changes, which allows the computer to track the various positioning points of the elements as the data structure changes. Under a doubly-linked list implementation, each node entry has both a previous pointer and a next pointer. The previous pointer indicates the previous linked position of the node entry, and the next pointer indicates the next linked position. Two doubly linked list methods are known in the art.

Figure 1:
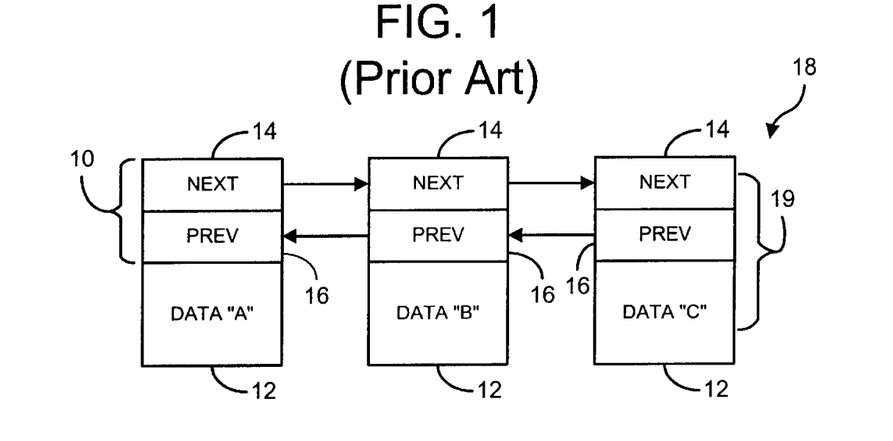
FIG. 1 is a schematic diagram of one prior method using a single linked list.

Referring to FIG. 1, a prior method for implementing doubly linked lists is shown. A node entry 10 generally includes a next pointer 14 and a previous pointer 16. Under this method, the node entry 10 is typically placed in the first few bytes of the data structure of the actual data set 12. The general order of the data structure begins with a next pointer 14, a previous pointer 16, and data set 12 respectively, which will all be referred to as a data element 19. Data elements A, B, and C are shown in FIG. 1 as an example, and all the data elements 19 are kept in a single linked list 18. For each data set 12, a node entry 10 of a next pointer 14 and a previous pointer 16 is located at the beginning of the data structure. The start of the node entry 10 and the start of the data set 12 share the same address in memory. The tracking of the data is straight forward. For example, as indicated by the arrows, the next pointer 14 of data element A refers to data element B, and next pointer of data element B refers to data element C. Similarly, in the reverse direction, the previous pointer 16 of data element C refers to data element B, and the previous pointer of data element B refers to data element A.

Because of this given arrangement, a node entry 10 can be easily deleted by redefining the node entries. For example, to delete data element B from the linked list 18 involves only two steps. The next pointer of data element A must be redefined to refer to the data element C. Similarly, the previous pointer of data element C must also be redefined to refer to data element A. More specifically, the program notations are "B.prev.next=B.next" and "B.next.prev=B.prev". This arrangement provides a constant time delete O(1), meaning that the time it takes to delete a node entry 10 is independent of how many nodes are in a single linked list 18. The time remains constant regardless of the number of data elements 19 in a linked list 18. As a result, the node entries 10 can be updated more easily and efficiently.

One problem with this method is that it allows the data element 19 to exist only in one linked list 18 at a time. Although the module processing speed is faster, it is less preferred for more complex data implementations because data elements cannot exist in multiple linked lists.

Figure 2:
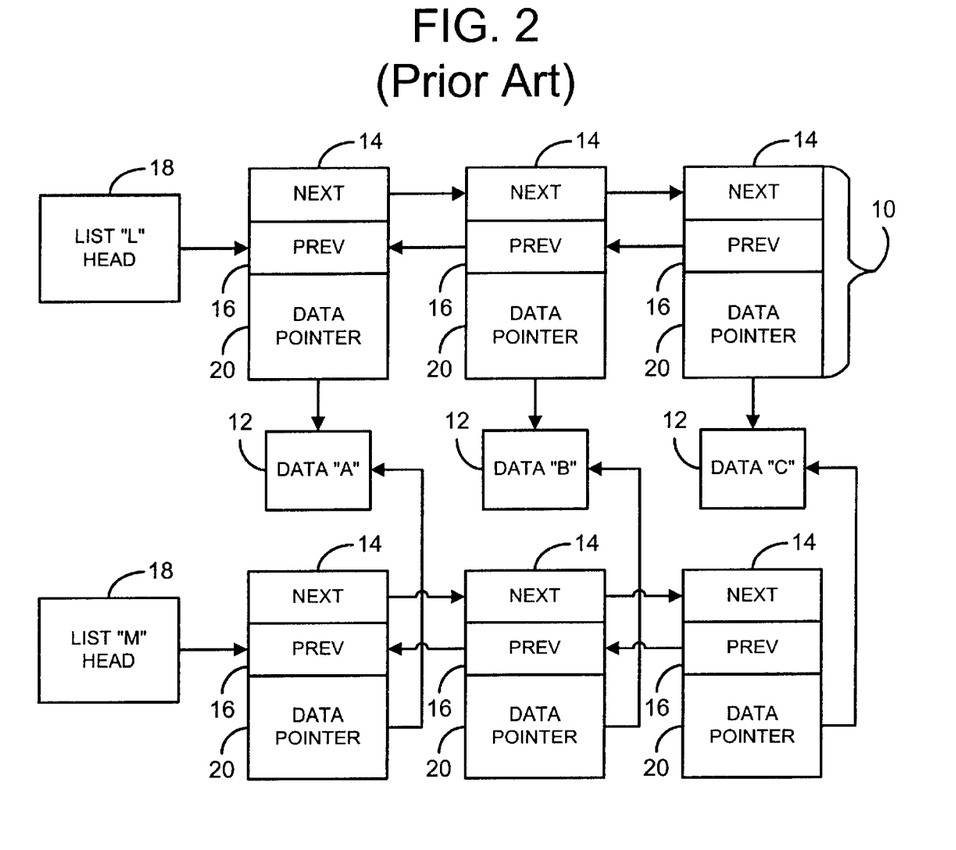
FIG. 2 is a schematic diagram of another prior method using multiple linked lists.

Turning to FIG. 2, another prior method for implementing doubly linked lists using multiple lists is shown. Rather than having the node entry 10 be embedded in the actual data set 12, this method uses a data pointer 20, which basically makes the node entry point to the actual data set. Unlike the node entry 10 in the previous method having both a next pointer 14 and a previous pointer 16, the node entry in this method has a next pointer, a previous pointer and a data pointer 20. As shown, multiple linked lists 18 can be used and a particular data set 12 can belong to multiple lists at the same time. Two linked lists L and M are shown as an example. In practice, thousands of linked lists 18 may be used.

However, a problem with this method is that in order to delete a data set 12 from a linked list 18, all the node entries in the linked list must be searched, which can be time consuming when hundreds of node entries in a single linked list must be searched to find the data set's corresponding node entry 10. For example, to delete data set B from linked list L, all the node entries must be searched in linked list L in order to find and delete the node entry with a data pointer to data set B. This method uses a O(n) delete time, wherein n is the number of node entries in a single linked list. In other words, the delete time factor of a node entry 10 is dependent upon the number of node entries in a linked list.

One problem with this method is that it is extremely inefficient and greater processing resources are needed to complete the same tasks as the previous method. As a result, the module processing speed is sacrificed because of the complexity.

Accordingly, a primary object of the present invention is to provide an improved system and method for tracking computer data that allows a data element to belong to multiple linked lists while the processing time is independent of number of data elements in any of the linked lists.

Another object of the present invention is to provide an improved system and method for tracking computer data that can update node entries more easily.

Still another object of the present invention is to provide an improved system and method for tracking computer data that is more efficient in terms of processing speed.

Yet another object of the present invention is to provide an improved system and method for tracking computer data that allows for data to belong to multiple linked lists without sacrificing processing speed.

BRIEF SUMMARY OF THE INVENTION

The present invention generally relates to a system and method for tracking computer data. More particularly, it relates to a system and method that tracks computer data that uses at least one table having all the node entries. Each node entry has a linked list identification, a previous pointer, and a next pointer. With the use of the table and node entries having a linked list identification, the present invention is able to provide an improved system and method for tracking computer data that allows data to belong to multiple linked lists but without sacrificing processing speed.

The present invention includes a system having at least one data set and at least one node table for each data set. Furthermore, it includes at least one node entry for each node table, wherein each node entry having a linked list identification, a previous pointer, and a next pointer. Lastly, at least one linked list referencing said at least one node entry is also included.

The present invention further includes a method including steps of creating at least one node entry designating a previous pointer and a next pointer for each data set, maintaining at least one node table having all the node entries for each data set, assigning said linked list identification to each said node entry, and maintaining at least one linked list for each said linked list identification.

Other objects, features and advantages will become apparent upon reading the following detailed description, in conjunction with the attached drawings, in which:

DETAILED DESCRIPTION

Broadly stated, the present invention is directed to an improved system and method for tracking computer data. By using a table of node entries and including a linked list identification in each node entry, the present invention provides an improved system and method for tracking computer data that allows data to belong to multiple linked lists without sacrificing processing speed, allowing for more complex data implementation in the most efficient manner. Furthermore, in the present invention, the updating of the node entries is simpler, quicker, and provides greater flexibility.

Figure 3:
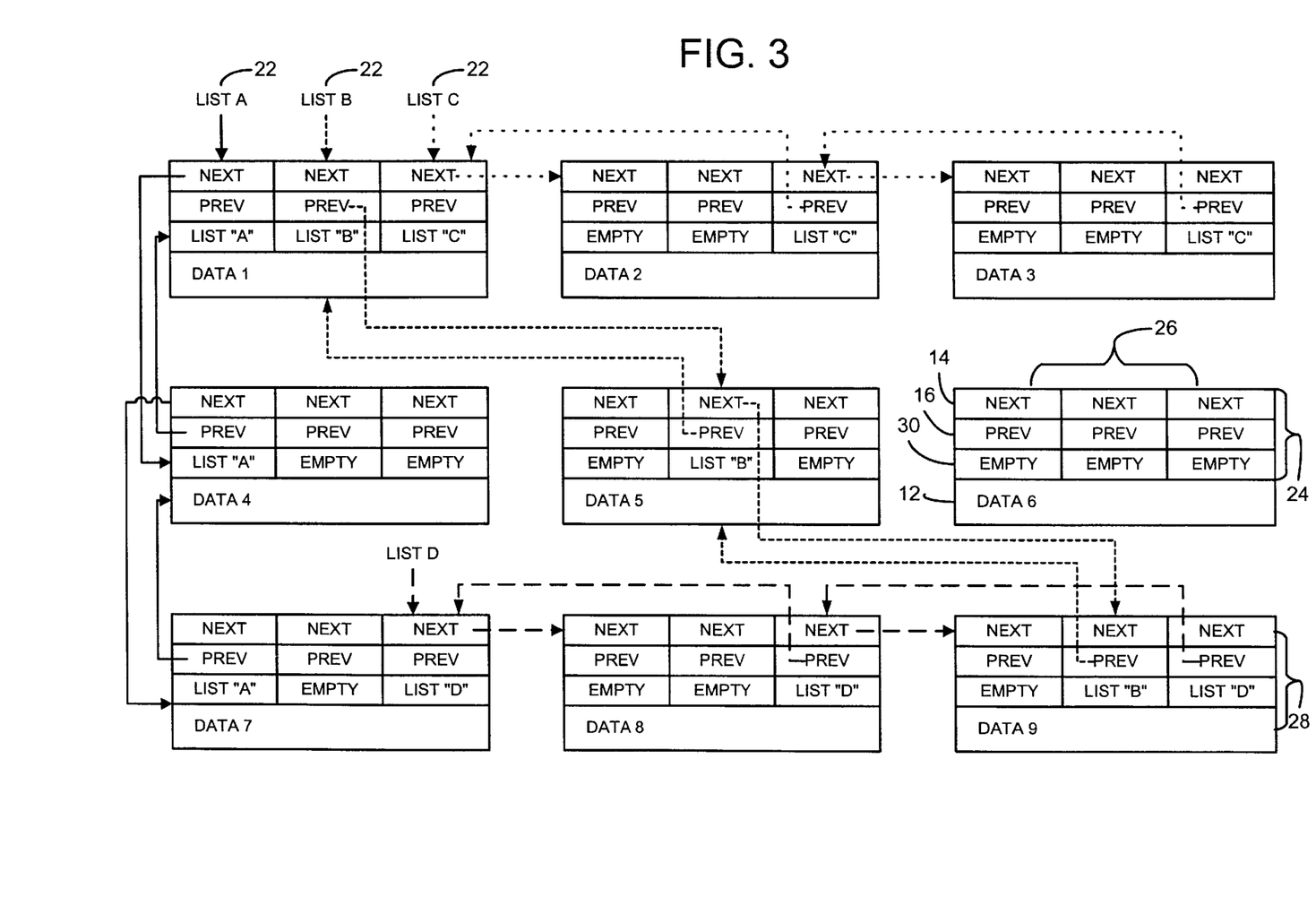
FIG. 3 is a schematic exemplary diagram of the present invention implemented with the use of four linked lists.
Figure 4:
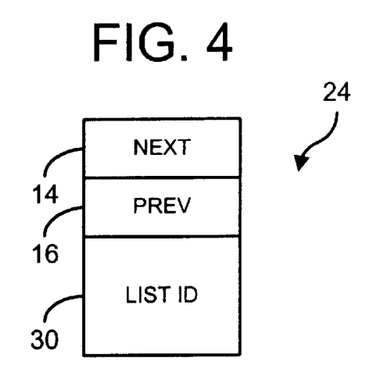
FIG. 4 is a schematic diagram of a node entry of the present invention.
Figure 5:
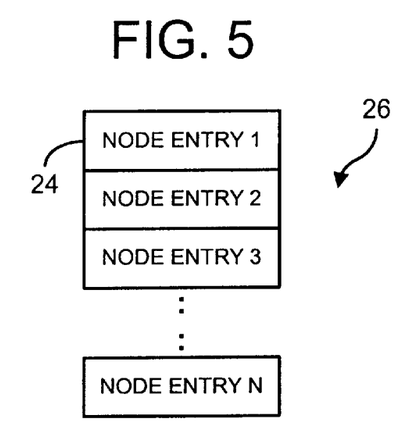
FIG. 5 is a schematic diagram of a node table of the present invention.

Turning to FIGS. 3, 4, 5, 6 and 7, an overall schematic diagram of the present invention with implementation of four linked lists 22, specifically Lists A, B, C and D, is shown in FIG. 3, and FIGS. 4, 5, 6 and 7 respectively show the structure of a node entry 24, node table 26, and a data element 28, and a linked list 22. Although only four linked lists 22 are shown in FIG. 3 for clarity, the actual implementation can contain as many linked lists as needed. As shown in FIG. 4, a node entry 24 has a next pointer 14, a previous pointer 16, and a linked list identification 30, and the node table 26 includes all the node entries for a particular data set 12 (shown in FIG. 5). A data element 28 includes the node table 26 and the data set 12 (shown in FIG. 6). Each data element 28 can belong to multiple linked lists. As shown in FIG. 3, pointers 14, 16 in a particular linked list 22 are linked to other data elements 28 in that same linked list.

Figure 6:
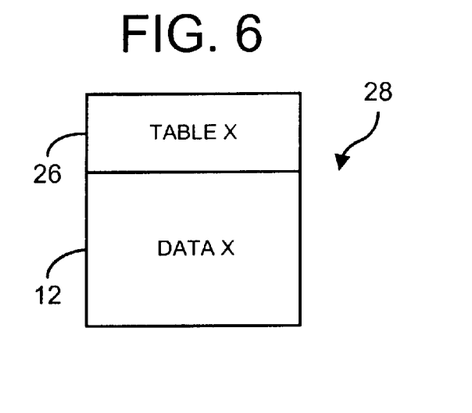
FIG. 6 is a schematic diagram of a data element.
Figure 7:
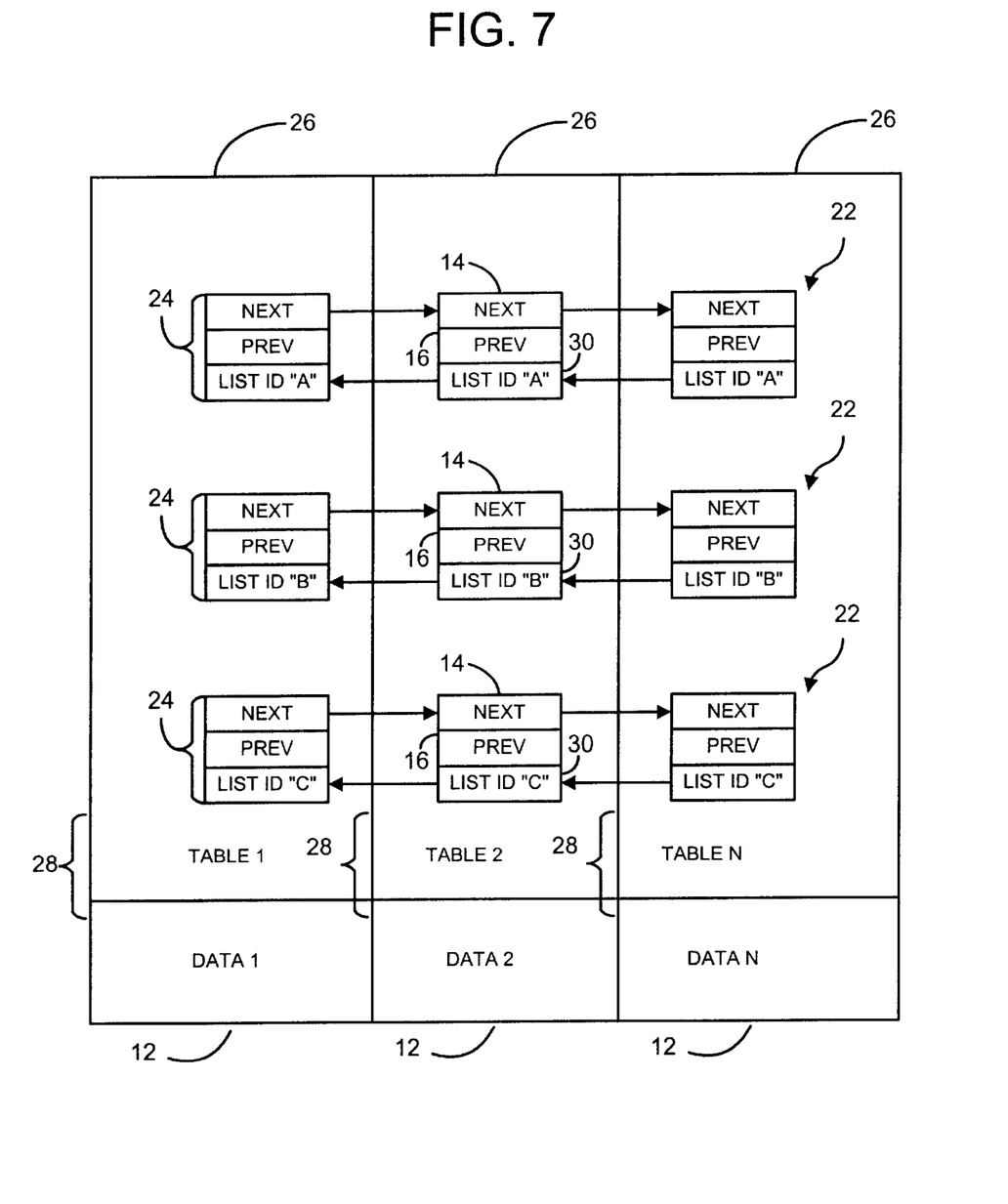
FIG. 7 is a schematic diagram of a linked list.

Each linked list identification 30 refers to a linked list 22 in the implementation. The list identification 30 can refer to null or empty, meaning that there is an available node entry in the table for a specific linked list. Because FIG. 3 is only an example of one implementation, other implementations can be done with slight alternation. For example, a dynamic system can be implemented. In a dynamic system, there would be no node entry with an empty identification, because the actual node entries are deleted and added from the node table 26 instead of being redefined. These other various implementations are contemplated and are within the scope of the present invention. As shown in FIG. 6, the node table 26 is preferably embedded in the first few bytes of the data set 12, which is the data element 28. However, the node table 26 does not necessarily have to be embedded into the data set 12, and other alternative structures, such as a two-way association between the node table and the data set, can be implemented and are within the scope of the present invention. The structure of a linked list 22, on the other hand, is an association between the linked list identification 30 and the various data sets 12. Referring to FIGS. 3 and 7, the node table 26 contains all the node entries 24 of a data set 12, which also includes the linked lists 18 since each node entry has a linked list identification 30. FIG. 7 shows the structure of the linked lists 22 in relation to the node table 26 and the data set 12. As shown, a linked list 22 includes the node entries 26 with the associated linked list identification 30 and their corresponding data set 12. With the combination of the structures of the node entry 24, node table 26, data element 28, and linked list 22, the present invention allows for data elements belonging to multiple linked lists while achieving a processing time that is independent of the number of data elements in any of the linked lists.

Figure 8:
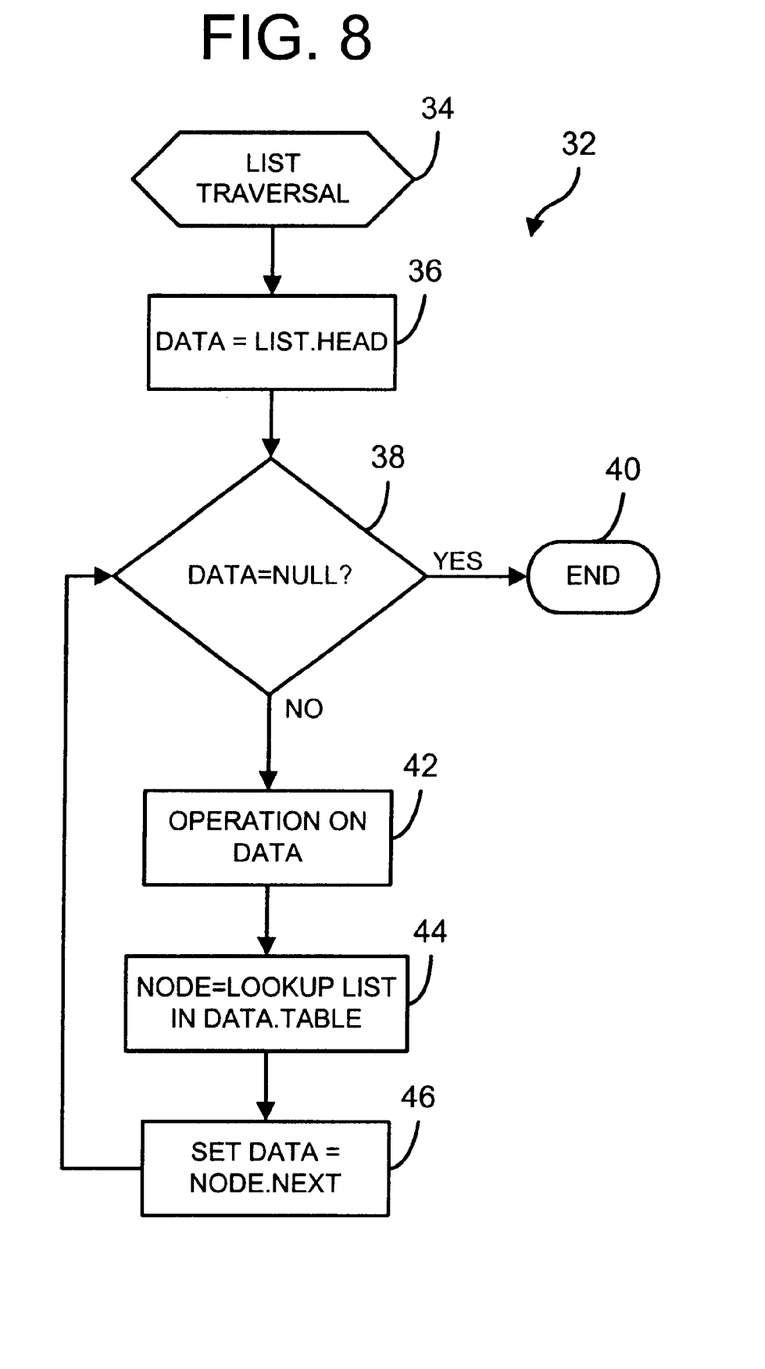
FIG. 8 is a flowchart illustrating the steps for traversing a linked list.

Referring now to FIG. 8, a flowchart showing the steps for a linked list traversal is shown and generally indicated at 32. To traverse a linked list (block 34), data is first defined to refer to the head of the linked list (block 36), which makes the traversal process start at the beginning of the linked list (i.e., the first entry or data element of the linked list). It is then determined whether the first data element 12 is equal to null or empty (block 38). In other words, it is checked whether there is a first data element 12 in the linked list 22. If the data element 12 does not exist, the data element is returned as null or empty (block 38), which ends the process (block 40). If, however, a data element 28 is found in the linked list 22, a null will not be returned (block 38).

Whatever operation that initiated this traversal process, such as a modification or an examination, would then be done on the data set 12 (block 42). After the operation, the node entry 24 of the data element 28 is looked up from the node table 26 (block 44), and the data is then set to the next pointer 14 of that found node entry 24 (block 44) in order to go to the next data element 28 of the linked list 18, which may or may not be null. Again, in the next node entry 24 of the data element 28, the process loops back to determine whether the newly defined data element is equal to null (block 38). The process continues until the data element is equal to null at some point in the process.

Figure 9:
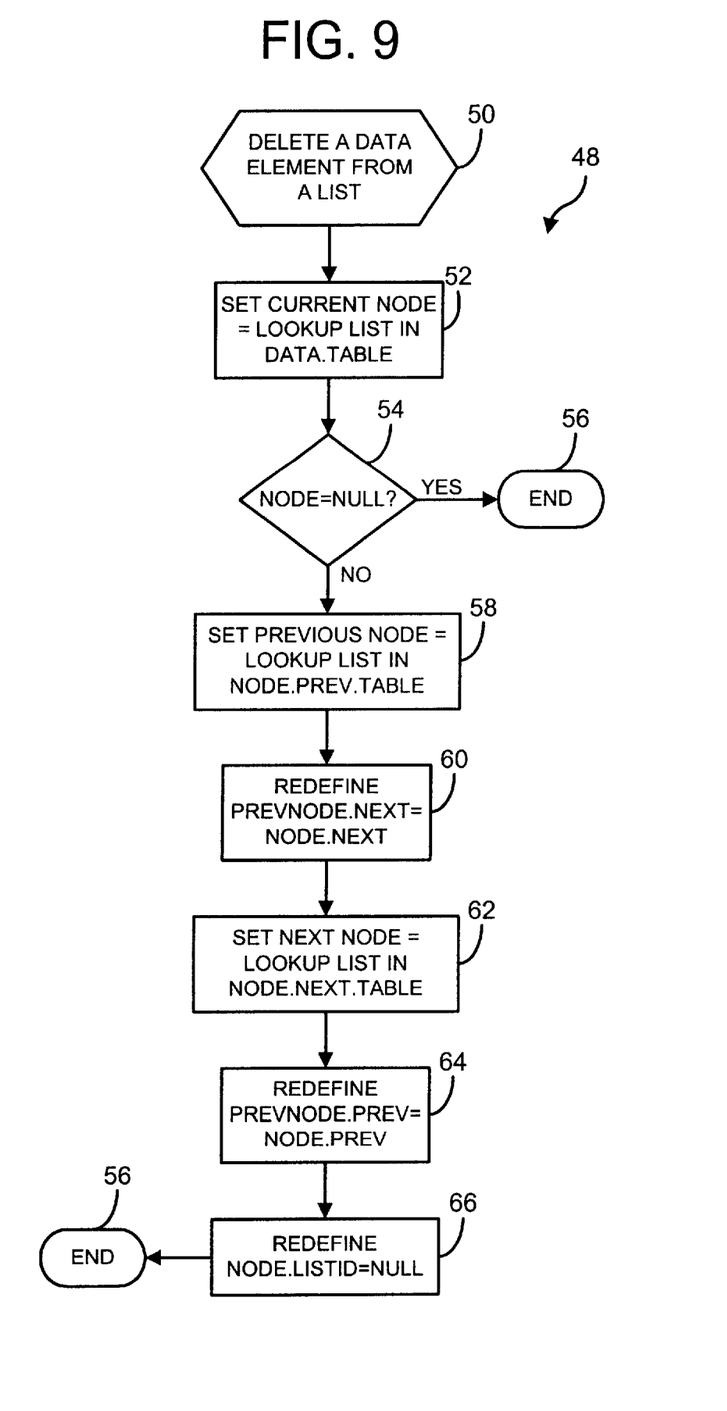
FIG. 9 is a flowchart illustrating the steps for deleting a data element from a linked list.

Referring to FIG. 9, a flowchart of the process of deleting a data element from a linked list is shown and generally indicated at 48. Deleting a data element from a linked list (block 50) involves first setting a temporary current node to a first node entry 24 with the linked list identification 30 found in the node table 26 (block 52). The temporary current node will equal null if the first node entry 24 with the linked list identification 30 is not found in the node table 26 (block 54), which will end the process in this case (block 56). If a first node entry 24 with the linked list identification 30 ("node entry A") is found in the node table 26, the temporary current node will not be denoted as null (block 54). In that case, a temporary previous pointer 16 will be set to look up a node entry 24 with the linked list identification 30 ("node entry B") in the data element 28 indicated by the previous pointer of node entry A ("data element B") (block 58). The next pointer of node entry B is then redefined to refer to the data element indicated by the next pointer of node entry A ("data element C") (block 60).

Similarly, a temporary next pointer 16 will be set to look up the node entry 24 with the linked list identification 30 ("node entry C") in the data element indicated by the next pointer of the node entry A (block 62), which is data element C as previous indicated. The previous pointer of node entry C is redefined to refer to the data element indicated by the previous pointer of node entry A, which is data element B (block 64). In summary, the next pointer of node entry B refers to data element C, and the previous pointer of node entry C refers to data element A. Finally, to complete the deletion from the linked list 22, the linked list identification 30 of node entry A is redefined as null (block 66).

A data element is deleted from a given linked list through the above process. More specifically, the node entry associated with the data element is redefined. Note that the node entry 24 is not actually deleted from the node table, but is redefined such that the previous and the next pointer does not refer to any other data element, and that the linked list identification 30 is changed to null so it would be available for adding the data element to a list at a later time. However, other implementations are available. For example, node entries can also be literally deleted or added from, and to, the node table. The steps involved can be altered slightly to accommodate the implementation, and these minor alterations are contemplated and are within the scope of the present invention.

Figure 10:
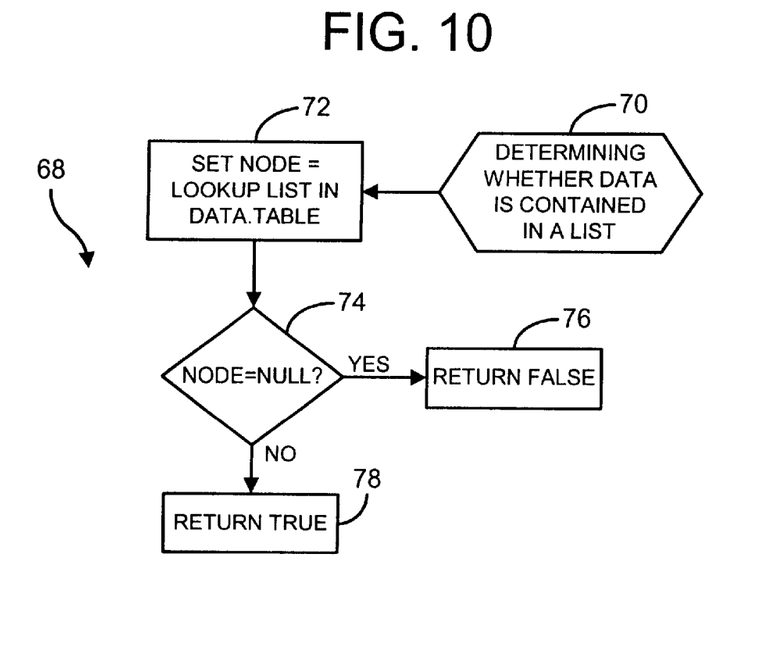
FIG. 10 is a flowchart illustrating the steps for determining whether data is contained in a particular linked list; and, FIG. 11 is a flowchart illustrating the steps for adding data to a linked list.

Turning now to FIG. 10, a flowchart of the steps for determining whether a data element 28 is contained in a particular linked list 22 is shown and generally indicated at 68. To determine whether data is contained in a particular linked list (block 70), the first step is to set a temporary node to look up a node entry 24 with the linked list identification 30 in the node table 26 (block 72). If no node entry 24 with the list identification 30 is found, the temporary node would equal to null (block 74) and returns false (block 76), meaning the data element 28 is not contained in the linked list 22. If, however, a node entry 24 with the linked list identification 30 is found, the temporary node would not be null (block 74) and returns a true (block 78) to indicate that a data element 28 is contained in that linked list 22.

Figure 11:
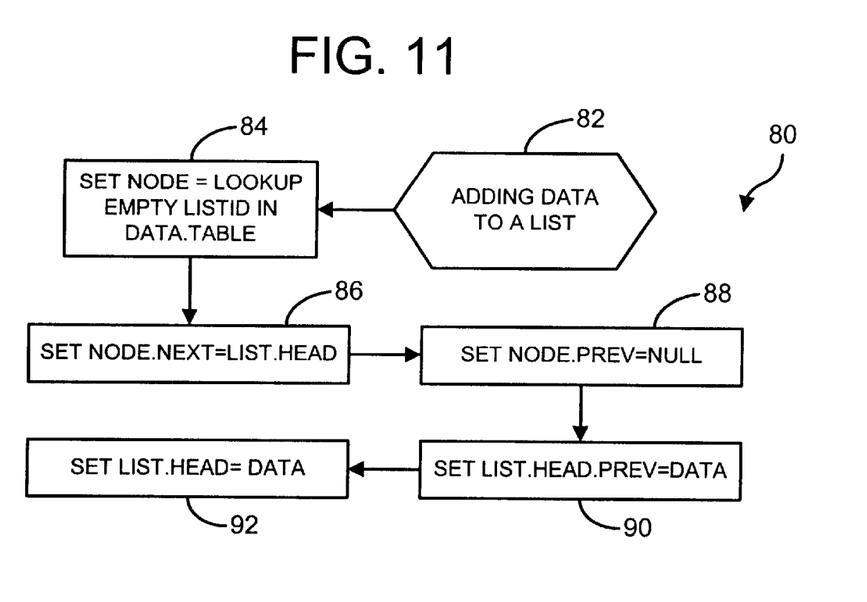

Next, a flowchart illustrating the steps for adding a data element to a linked list is shown in FIG. 11 and generally indicated at 80. In order to add a data element 28 to a linked list 22 (block 82), a temporary node must be set to look up a node entry 24 with an empty list identification 30 in the node table 26 (block 84). Although there may be many node tables 26 available, preferably the first node entry with an empty list identification will be used for this process. However, a variety of methods can be used, such as the last node entry or addition of a new node entry either dynamically allocated or retrieved. These various linked list structures can be implemented with only minor modification. And these other methods and implementation are contemplated and are within the scope of the present invention.

Once a node entry 24 with an empty list identification 30 ("node entry D") is found, the next pointer of node entry D is defined to refer to the first data element or the head of the linked list ("data element E") (block 86). The previous pointer of the node entry D will be defined as null (block 88), since it will be the new first data element 28 of the linked list 22. Data element E would be similarly changed to accommodate the changes made from adding node entry D to the linked list 22. In this case, a previous pointer of the node entry of data element E with the linked list identification will be redefined to refer to the data element 28 associated with node entry D (block 84), and the head of the linked list would similarly now refer to the data element 28 containing node entry D, because the data element containing node entry D is now the head or first data element of the linked list 22. Please note that since a circular doubly linked list implementation does not involve a first or last node entry, the method would be different from the current process shown. However, the implementations of other types of linked lists are contemplated and are within the scope of the present invention.

From the foregoing description, it should be understood that an improved system and method for tracking computer data have been shown and described which have many desirable attributes and advantages. The system and method allows for the use of multiple linked lists without sacrificing processing speed when tracking data. Furthermore, the updating of node entries can be easy and requires a simpler process than prior multiple linked list methods. As a result, more efficient processing speed is achieved.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A system for tracking computer data in a computer, comprising:

at least one data element comprising a data set and at least one node table for said data set;

at least one node entry for said node table, said node entry having a linked list identification, a previous pointer, and a next pointer; and, at least one linked list referencing said at least one node entry;

wherein the processing time of said system is independent of the number of data elements in any of said linked lists; and wherein a new data element is added to said linked list by having a next pointer of a new node entry having said linked list identification for said new data element refer to a first data element of said linked list, defining a previous pointer of said new node entry as null, having a previous pointer of a node entry having said linked list identification for said first data element refer to said new data element, and redefining said new data element as a first data element for said linked list.

2. The system as defined in claim 1 wherein said linked list identification can refer to a null.

3. The system as defined in claim 1 wherein said previous pointer indicates a previous linked position containing said node entry for said linked list identification.

4. The system as defined in claim 1 wherein said next pointer indicates a next linked position containing said node entry for said linked list identification.

5. The system as defined in claim 1 wherein said node table is embedded in said data set.

6. The system as defined in claim 1 wherein said linked list is traversed by said previous pointer and said next pointer associated to said linked list identification.

7. The system as defined in claim 1 wherein a determination that a data element belongs to a particular linked list can be made by finding said linked list identification in said node table.

8. A system for tracking computer data in a computer, comprising:

at least one data element comprising a data set and at least one node table for said data set;

at least one node entry for said node table, said node entry having a linked list identification, a previous pointer, and a next pointer; and, at least one linked list referencing said at least one node entry;

wherein the processing time of said system is independent of the number of data elements in any of said linked lists; and wherein a new data element is added to said linked list by having a previous pointer of a new node entry having said linked list identification for said new data element refer to a last data element of said linked list, defining a next pointer of said new node entry as null, having a next pointer of a node entry having said linked list identification for said last data element refer to said new data element, and redefining said new data element as a last data element for said linked list.

9. A system for tracking computer data in a computer, comprising:

at least one data element comprising a data set and at least one node table for said data set;

at least one node entry for said node table, said node entry having a linked list identification, a previous pointer, and a next pointer; and, at least one linked list referencing said at least one node entry;

wherein the processing time of said system is independent of the number of data elements in any of said linked lists; and wherein an old data element is deleted from said linked list by redefining a next pointer of a node entry having said linked list identification in the data element indicated by a previous pointer of an old node entry for said old data element to refer to a data element indicated by a next pointer of said old data element, and redefining a previous pointer of a node entry having said linked list identification in a data element indicated by a next pointer of said old data element to refer to a data element indicated by a previous pointer of said old node entry.

10. A method of tracking computer data having at least one data set, said method comprising the steps of:

creating at least one node entry designating a previous pointer and a next pointer for each data set;

embedding at least one node table in said data set, said node table having all the node entries for each data set;

assigning a linked list identification to each said node entry, said embedded at least one node table and said data set defining a data element;

traversing said data elements using said previous pointer and said next pointer of said node entry associated to said particular linked list identification; and maintaining at least one linked list for each said linked list identification;

wherein the processing time of tracking data is independent of the number of node entries in any of said linked lists; and wherein the traversing step further comprising the steps of:
 setting data=list.head;
 determining whether said data equal null;
 ending process if said data equal null; and,
 performing an operation on said data if said data does not equal to null.

11. The method according to claim 10 wherein said performing operation step further comprising the steps of:
 setting node=lookup a node entry with linked list identification in data.table; and,
 setting data=node.next.

12. A method of tracking computer data having at least one data set, said method comprising the steps of:

creating at least one node entry designating a previous pointer and a next pointer for each data set;

embedding at least one node table in said data set, said node table having all the node entries for each data set;

assigning a linked list identification to each said node entry, said embedded at least one node table and said data set defining a data element;

maintaining at least one linked list for each said linked list identification; and determining whether a data element is contained in a particular linked list; said determining step further comprising the steps of:
 setting node=look up node entry with linked list identification in data.table;
 determining whether said node equals null;
 returning false if said node equals null; and,
 returning true if said node does not equal null;
 wherein the processing time of tracking data is independent of the number of node entries in any of said linked lists.

13. A method of tracking computer data having at least one data set, said method comprising the steps of:

creating at least one node entry designating a previous pointer and a next pointer for each data set;

embedding at least one node table in said data set, said node table having all the node entries for each data set;

assigning a linked list identification to each said node entry, said embedded at least one node table and said data set defining a data element;

maintaining at least one linked list for each said linked list identification comprises adding a new data element to said linked list, said adding step further comprising the steps of:
 setting a temporary node=lookup a node entry with an empty linked list identification in data.table;
 setting node.next=list.head;
 setting node.prev=null;
 setting list.head.prev=data; and,
 setting list.head=data
 wherein the processing time of tracking data is independent of the number of node entries in any of said linked lists.

14. A method of tracking computer data having at least one data set, said method comprising the steps of:

creating at least one node entry designating a previous pointer and a next pointer for each data set;

embedding at least one node table in said data set, said node table having all the node entries for each data set;

assigning a linked list identification to each said node entry, said embedded at least one node table and said data set defining a data element;

maintaining at least one linked list for each said linked list identification, by deleting an old data element from said linked list;

wherein said deleting step further comprising the steps of:
 setting a temporary current node=lookup list in data.table; and,
 determining whether said temporary current node equals null;
 ending process if said temporary current node equals null;
 setting prevNode=lookup list in node.prev.table if said temporary current node does not equal null; and wherein the processing time of tracking data is independent of the number of node entries in any of said linked lists.

15. The method according to claim 14 wherein said setting prevNode=lookup list in node.prev.table step further comprising the steps of:

redefining prevNode.next=node.next;
setting nextNode=lookup list in node.next.table;
redefining nextNode.prev=node.prev; and,
redefining node.listid=null.

* * * * *